(12) United States Patent
Norin

(10) Patent No.: US 8,571,464 B2
(45) Date of Patent: *Oct. 29, 2013

(54) OMNIDIRECTIONAL SWITCHABLE BROADBAND WIRELESS ANTENNA SYSTEM

(75) Inventor: John L. Norin, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 499 days.

This patent is subject to a terminal disclaimer.

(21) Appl. No.: 12/797,412

(22) Filed: Jun. 9, 2010

(65) Prior Publication Data

US 2010/0311321 A1 Dec. 9, 2010

Related U.S. Application Data

(60) Provisional application No. 61/185,552, filed on Jun. 9, 2009.

(51) Int. Cl.
*H04H 40/90* (2008.01)
(52) U.S. Cl.
USPC ..... 455/3.02; 455/13.3; 455/41.2; 455/552.1; 725/110
(58) Field of Classification Search
USPC .......... 455/3.02, 3.05, 3.06, 427, 13.3, 556.1, 455/557, 562.1, 575.7, 121, 188.1, 550.1, 455/12.1, 569.1, 101, 272, 525, 63.1, 63.4; 725/110; 342/359, 357.06, 372, 378, 342/432, 104; 370/316; 343/702
See application file for complete search history.

(56) References Cited

U.S. PATENT DOCUMENTS

| | | | | |
|---|---|---|---|---|
| 5,283,587 | A * | 2/1994 | Hirshfield et al. | 342/372 |
| 5,504,493 | A * | 4/1996 | Hirshfield | 342/372 |
| 6,040,799 | A * | 3/2000 | Tachihara et al. | 342/357.64 |
| 6,600,929 | B1 * | 7/2003 | Toncich et al. | 455/522 |
| 6,903,656 | B1 * | 6/2005 | Lee | 340/572.1 |
| 7,327,983 | B2 * | 2/2008 | Mehta et al. | 455/63.1 |
| 8,175,532 | B2 * | 5/2012 | Nanda et al. | 455/63.4 |

(Continued)

FOREIGN PATENT DOCUMENTS

| | | |
|---|---|---|
| EP | 1517398 A1 | 3/2005 |
| WO | 2005025100 A2 | 3/2005 |
| WO | 2009013297 A1 | 1/2009 |

OTHER PUBLICATIONS

Poussot, Benoit; Laheurte, Jean-Marc; Cirio, Laurent; Picon, Odile; Delcroix, David; Dussopt, Laurent; "Diversity Measurements of a Reconfigurable Antenna with Switched Polarizations and Patterns"; IEEE Transactions on Antennas and Propagation; IEEE Service Center; Piscataway, New Jersey, USA; LNKD-DOI: 10.1109/TAP.2007. 913032; vol. 56, No. 1; Jan. 1, 2008; pp. 31-38; XP011199774; ISSN: 0018-926X.

(Continued)

*Primary Examiner* — Tan Trinh

(57) ABSTRACT

Systems and methods for increasing coverage and throughput in a wireless communication system. An antenna for use in a wireless communications system in accordance with one or more embodiments of the present invention comprises a plurality of antenna elements, an antenna selection switch, coupled to the plurality of antenna elements, and a control system, coupled to the antenna selection switch, wherein the control system selectively energizes the plurality of antenna elements to create a communications link to a device in the wireless communications system through the antenna.

18 Claims, 8 Drawing Sheets

(56) References Cited

U.S. PATENT DOCUMENTS

| | | | |
|---|---|---|---|
| 2004/0157637 A1* | 8/2004 | Steer et al. | 455/525 |
| 2005/0068915 A1* | 3/2005 | Atad et al. | 370/316 |
| 2005/0097607 A1* | 5/2005 | Kummer et al. | 725/58 |
| 2005/0122262 A1* | 6/2005 | Ahn | 342/359 |
| 2005/0239404 A1* | 10/2005 | Karabinis | 455/12.1 |
| 2005/0287962 A1* | 12/2005 | Mehta et al. | 455/101 |
| 2006/0025132 A1 | 2/2006 | Karaoguz et al. | |
| 2007/0139282 A1* | 6/2007 | Haruyama | 343/702 |
| 2008/0060047 A1 | 3/2008 | Holliday et al. | |
| 2008/0098212 A1* | 4/2008 | Helms et al. | 713/155 |
| 2008/0285504 A1 | 11/2008 | Lin | |
| 2009/0113044 A1 | 4/2009 | Lancaster et al. | |
| 2010/0269146 A1* | 10/2010 | Britt | 725/110 |
| 2010/0313232 A1* | 12/2010 | Norin | 725/110 |
| 2012/0291104 A1* | 11/2012 | Hasek | 726/4 |

OTHER PUBLICATIONS

Hamaguchi, Kiyoshi; Shoji, Yozo; Ogawa, Hiroyo; Sato, Hiroya; Tokuda, Kiyohito; Hirachi, Yasutake; Iwasaki, Toshiya; Akeyama, Akira; Ueki, Katsuhiko; Kizawa, Takao; "A Wireless Video Homelink Using 60GHz Band: Concept and Performance of the Developed System"; 30th European Microwave Conference Proceedings; Paris, France; Oct. 3-5, 2000; [Proceedings of the European Microwave Conference]; London: CMP, GB; vol. Conf. 30; Oct. 3, 2000; pp. 293-296; XP001060751.

International Search Report and Written Opinion dated Sep. 23, 2010 in International Application No. PCT/US2010/038035 filed Jun. 9, 2010 by John L. Norin.

Non-final Office action dated Jul. 17, 2012 in U.S. Appl. No. 12/797,570, filed Jun. 9, 2010 by John L. Norin.

Final Rejection dated Jan. 29, 2013 in U.S. Appl. No. 12/797,570, filed Jun. 9, 2010 by John L. Norin.

Non-final Office action dated May 17, 2013 in U.S. Appl. No. 12/797,570, filed Jun. 9, 2010 by John L. Norin.

Final Rejection dated Sep. 12, 2013 in U.S. Appl. No. 12/797,570, filed Jun. 9, 2010 by John L. Norin.

* cited by examiner

OMNIDIRECTIONAL SWITCHABLE BROADBAND WIRELESS ANTENNA SYSTEM

CROSS-REFERENCE TO RELATED APPLICATIONS

This application claims the benefit of 35 U.S.C. §119(e) of U.S. Application Ser. No. 61/185,552, filed on Jun. 9, 2009, by John L. Norin, entitled "OMNIDIRECTIONAL SWITCHABLE BROADBAND WIRELESS ANTENNA SYSTEM," which application is incorporated by reference herein.

This application is related to U.S. application Ser. No. 12/797,570, filed on Jun. 9, 2010, by John L. Norin, entitled "INTEGRATED SATELLITE-TV BROADBAND WIRELESS SYSTEM," which application is incorporated by reference herein.

BACKGROUND OF THE INVENTION

1. Field of the Invention

The present invention relates generally to wireless communications systems, and in particular, to an omnidirectional switchable broadband wireless antenna system.

2. Description of the Related Art

The use of wireless devices for communication has become commonplace. Several wireless networks, e.g., Verizon, Sprint, T-Mobile, AT&T, etc., provide voice, data, video, and other communications services via terrestrial based "cellular" services, and other providers, e.g., Intelsat, Iridium, etc., provide wireless services via satellite.

Cellular telephone service, however, is limited by the ability of the wireless system to communicate where cellular signals may be blocked or otherwise below the ability of the handheld devices to recognize. For example, and not by way of limitation, cellular handsets typically have antennas with limited gain, and therefore, the antenna on the handset cannot transmit enough power or receive enough signal strength to communicate in certain areas. Other limitations on cellular communications include urban canyons, remote areas, and multipath interference that may prevent or degrade signals in a cellular system, impacting both coverage and capacity of the cellular system.

It can be seen, then, that there is a need in the art to increase the ability to access the cellular system in certain geographical areas, and to increase the capacity and efficiency of the overall cellular system.

SUMMARY OF THE INVENTION

To minimize the limitations in the prior art, and to minimize other limitations that will become apparent upon reading and understanding the present specification, the present invention comprises systems and methods for increasing throughput in a wireless communication system.

An antenna for use in a wireless communications system in accordance with one or more embodiments of the present invention comprises a plurality of antenna elements, an antenna selection switch, coupled to the plurality of antenna elements, and a control system, coupled to the antenna selection switch, wherein the control system selectively energizes the plurality of antenna elements to create a communications link to a device in the wireless communications system through the antenna.

Such an antenna further optionally comprises the control system selectively energizing the plurality of antenna elements to increase a data rate to the device in the wireless communications system, the control system using feedback from the device to selectively energize the plurality of antenna elements, the wireless communications system using communications signals having a plurality of polarizations, the plurality of antenna elements being selected based on a polarization of the communications signals used in the communications link to the device, the antenna being mounted proximate with a satellite receive antenna, the antenna providing a higher signal throughput as compared to a wireless communications system lacking the antenna, the higher signal throughput being provided by an increase in wireless communications system signal strength, the higher signal throughput being provided by additional gain in the antenna, the device being coupled to a satellite broadcast system through the antenna, and a coaxial networking bridge, for coupling a satellite signal on the satellite broadcast system with a wireless signal in the wireless communications system, wherein the coaxial network bridge enables the device to receive the satellite signal and the wireless signal.

A system for combining a satellite broadcast system with a wireless network in accordance with one or more embodiments of the present invention comprises a wireless network antenna, comprising a plurality of antenna elements, an antenna selection switch, coupled to the plurality of antenna elements, and a control system, coupled to the antenna selection switch, wherein the control system selectively energizes the plurality of antenna elements to create a communications link to a device in the wireless communications system through the antenna, a satellite receive antenna, and a coaxial networking bridge, coupled to the satellite receive antenna and the wireless network antenna, for coupling a satellite signal on the satellite broadcast system with a wireless signal on the wireless network, wherein the coaxial network bridge enables a device to receive the satellite signal and the wireless signal.

Such a system further optionally comprises the wireless system device being mounted with the satellite receive antenna, the wireless system device being a relay device for at least one wireless device, the at least one wireless device receiving the satellite signal, a device using the wireless network selectively communicates with the wireless network through the wireless network antenna based on signal characteristics of the device, communication with the device switching between the wireless network antenna and another antenna in the wireless network during communication with the device, and the wireless antenna serving as a relay for a wireless device.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Operating Environment

Figure 1:
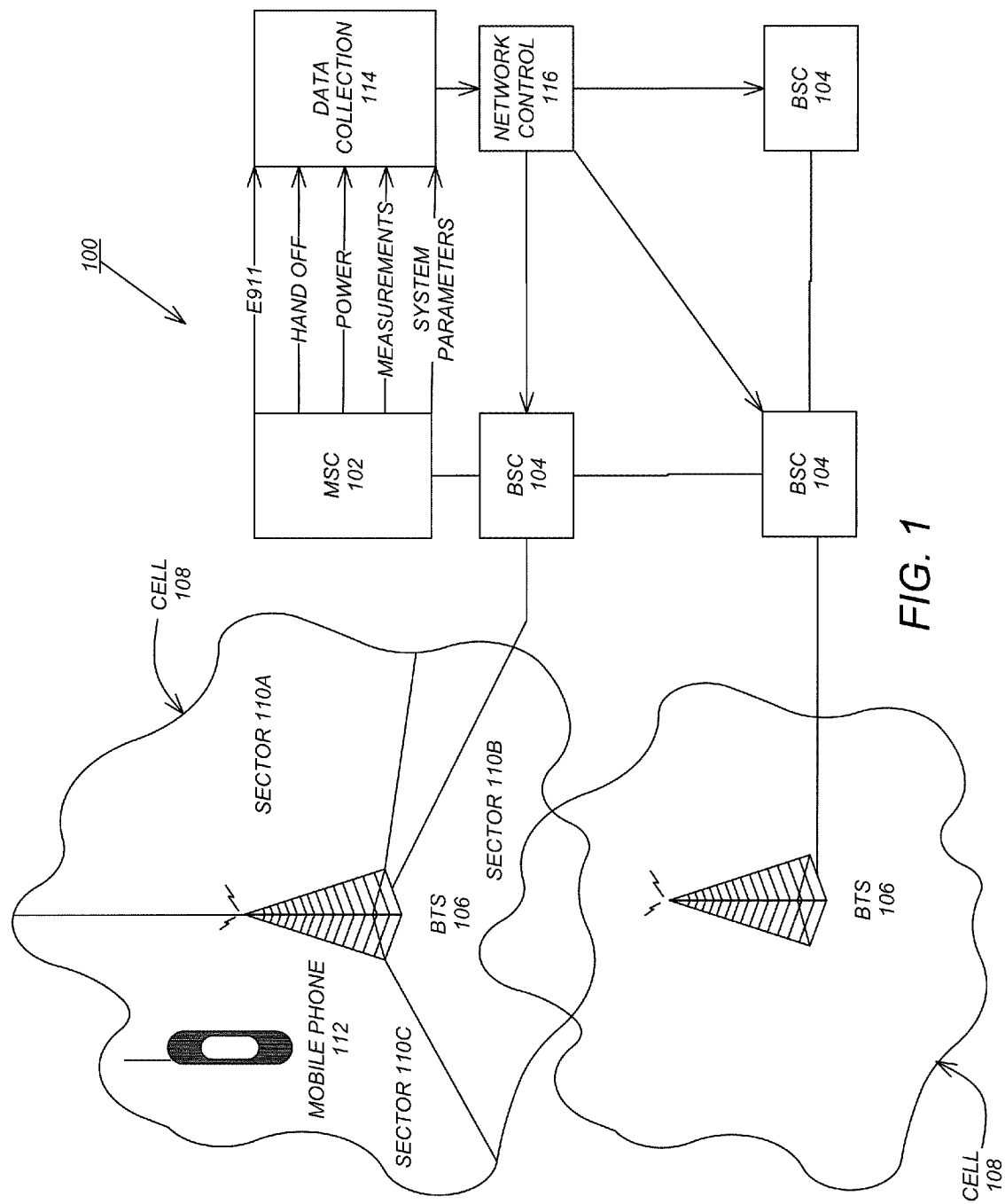
FIG. 1 illustrates a typical wireless network of the related art.

FIG. 1 illustrates a wireless network 100 according to one or more embodiments of the present invention. In a preferred embodiment, the network 100 comprises a cellular telephone system, although other wireless networks 100 could be used as well. Other wireless networks 100 that could benefit from the present invention include mobile and/or cellular data networks, wireless broadband networks, multi-channel multipoint distribution service (MMDS) networks, wireless personal area networks, wireless local area networks, and the like.

The network 100 typically includes at least one MSC (Mobile Switching Center) 102, at least one BSC (Base Station Controller) 104, at least one BTS (Base Transceiver Station) 106 (and associated antennae). The limits of RF signal coverage from the BTS 106 defines a perimeter of the associated cell coverage 108, which is often irregular in shape due to the shape of terrain and the presence of buildings and other structures. The BTS 106 may include omni-directional or directional antennae, wherein the directional antennae can be used to define sectors 110A-C within the cell site 108.

The MSC 102 typically interfaces to a Data Collection system 114, and provides various types of information thereto. This information may include, inter alia, E911 location information, (e.g., Latitude, Longitude, Height, Speed, Direction, etc.), Hand Off (HO) information (e.g., HO status, etc.), and Power information (e.g., Ec/Io=Energy per code bit/Intracell interference, Eb/Io=Energy per bit/Intracell interference, ERP=effective radiated power, path loss, fading, etc.), as well as other Measurements and System Parameters (e.g., peak data rate, throughput, delay, time of the day, noise floor, environmental characteristics, user density, average talk time, call blocking rate, etc.). This information is analyzed by the Data Collection and Filtering system 114 and the results of this analysis are provided to a Network Control system 116 to dynamically control the operation of the network 100.

When Ec/Io, ERP, or other signal characteristics of the signals in network 100 fall below a certain minimum requirement for network 100, the communications link between mobile phone 112 and BTS 106 cannot be supported, and, thus, the link will be broken, resulting in a "dropped call" or other break in communication between mobile phone 112 and BTS 106. The present invention provides additional support and throughput to this link to maintain communication links where the current network 100 cannot.

Antenna System

Figure 2:
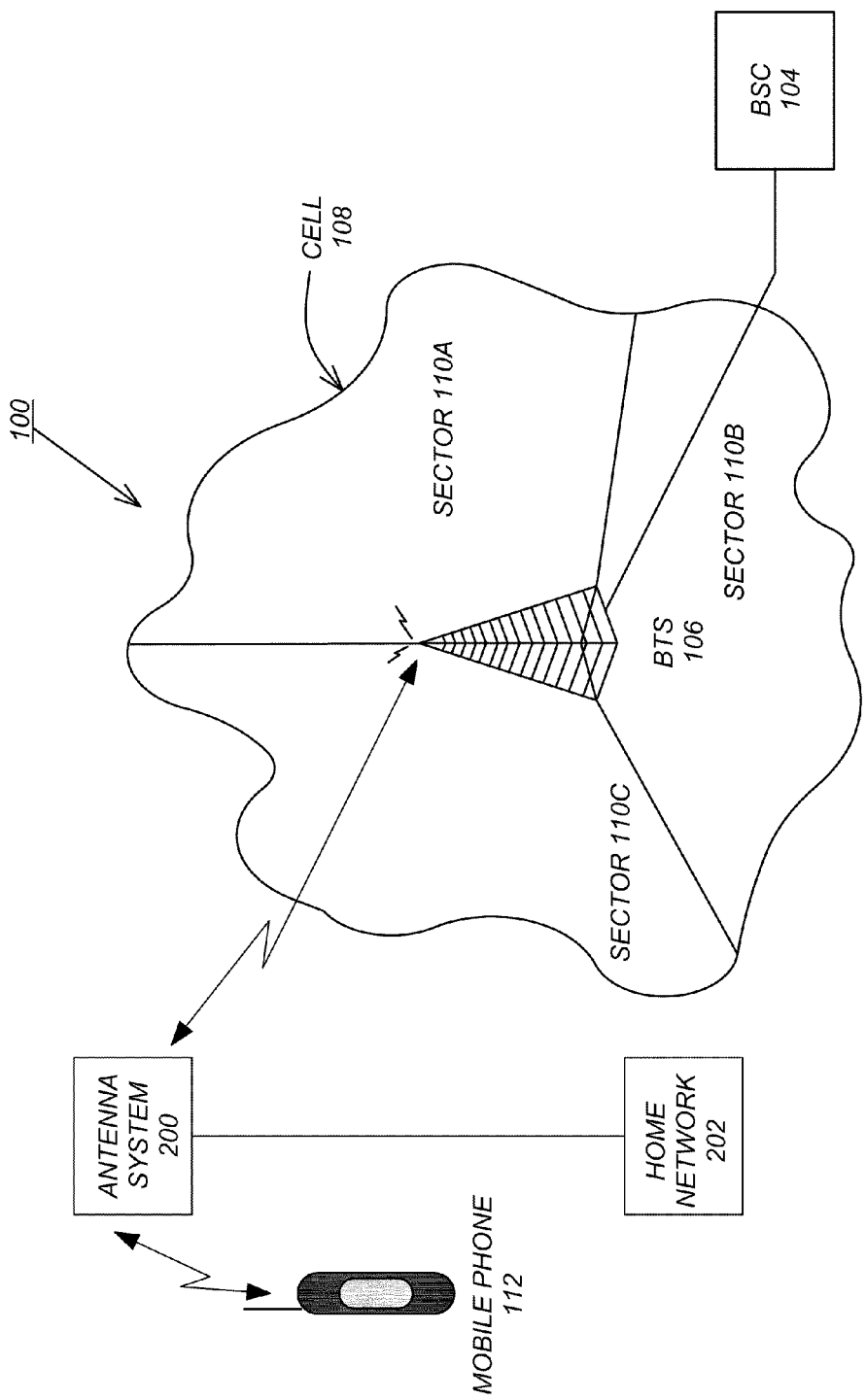
FIG. 2 illustrates a wireless system in accordance with one or more embodiments of the present invention.

FIG. 2 illustrates a wireless system in accordance with one or more embodiments of the present invention.

In addition to system 100, a system in accordance with one or more embodiments of the present invention further comprises an antenna system 200, which enables mobile phone 112, or, concurrently and/or alternatively, a home network 202, to access system 100 via antenna system 200.

Figure 3:
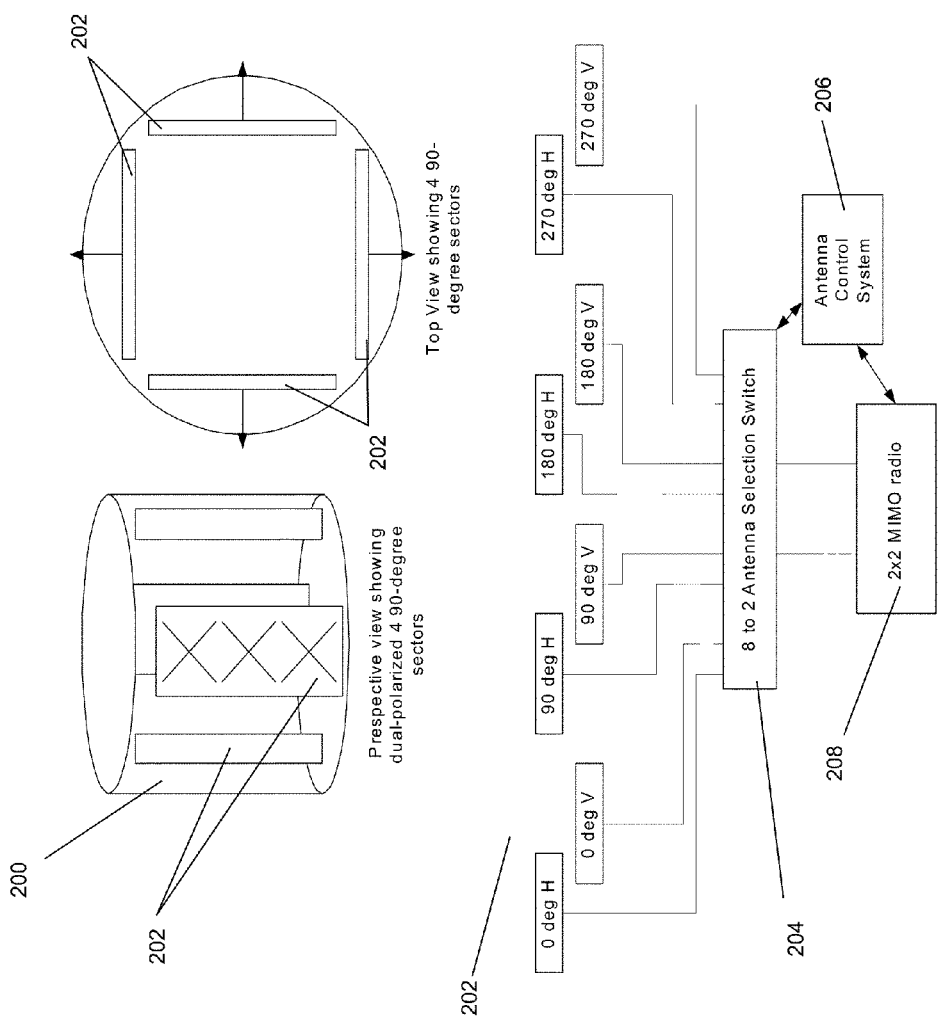
FIG. 3 illustrates an embodiment of an antenna system in accordance with one or more embodiments of the present invention.

FIG. 3 illustrates an embodiment of an antenna system in accordance with one or more embodiments of the present invention.

Antenna system 200 is shown as a multiple element antenna, with elements 202 comprising horizontal and vertical polarization receive/transmit elements. Antenna elements 202 can also be arranged to receive arbitrarily polarized signals, or signals with circular polarizations, slant cross-polarizations, or other types of polarizations used for signal transmission and reception, without departing from the scope of the present invention. Elements 202 are typically arranged in approximately 90 degree sectors, such that each of the elements 202 covers an approximately 90 degree field of view, although other arrangements of elements 202 are possible within the scope of the present invention.

The antenna elements 202 are coupled to an antenna selection switch 204, which is controlled by antenna control system 206 to select and determine signal characteristics, e.g., signal strength, received at each of the elements 202, and determines which one or ones of the elements 202 should be energized, and in which phases the elements should be energized, or, alternatively or collectively, which elements 202 should be used to allow antenna system 200 to best communicate with wireless network 100. Antenna beams from antenna system 200 can be formed with single antenna elements 200, or by combining a plurality of individual elements 200 to create a new antenna beam from combining two or more elements 200. A typical solution in accordance with the present invention uses four elements 200 per polarization to create eight antenna 200 beams per polarization by using the individual antenna 200 beams, and by combining each pair of two adjacent antenna beams 200, but other beam patterns, element 200 combinations, or communications paths with antenna 200 are possible within the scope of the present invention.

Although described with respect to 90 degree sector elements 202, any number of elements 202 can be used with an antenna 200 within the scope of the present invention. For example, and not by way of limitation, there can be twenty elements 202: ten elements 202 for horizontal polarization and 10 elements 202 for vertical polarization, where each element is arranged in an approximately 36 degree sector. Corresponding changes would then be made to antenna selection switch 204 and antenna control system 206 to properly configure such an antenna 200 with additional or fewer elements 202.

Because the antenna control system 206 can determine signal characteristics received at any or all of the elements 202, the antenna 200 can be oriented in a variety of directions upon installation of antenna 200 at a given installation. Thus, antenna 200 can be pointed in any direction, rather than point antenna 200 in a particular direction to receive signals from system 100, which would require a more complicated installation procedure for antenna 200.

Such installation freedom renders the antenna 200 as "omnidirectional" in terms of installation, but directional in terms of usage because of the control provided by antenna control system 206. So for example, and not by way of limitation, since antenna control system 206 can determine which of the element(s) 202 are receiving signals, and, through computation, which direction the signals are coming from, the zero degree horizontal and zero degree vertical elements 202 are not required to point directly or even approximately at the source of the signals from system 100. Instead, the antenna control system 206 can energize and/or de-energize elements 202 to allow antenna 200 to receive the signal at as high a signal strength as possible by configuring the phase and/or energization of the individual elements 202 to match the incoming signal characteristics.

Further, antenna 200 can be re-configured should signal conditions change. For example, and not by way of limitation, system 100 can place additional cells 108, with corresponding additional BTS 106 antennas, which may change the direction and/or strength of signals being received by antenna 200. As such, periodically or continuously, control system 206 can evaluate the signals being received by antenna 200 and adjust the energization of elements 202 to allow for increased bit rates, signal strength, or other desired signal characteristic based on monitoring of the signals being received by antenna 200 and making corresponding changes to the elements 202 via control system 206. No physical re-alignment of antenna 200 would typically be required, because control system 206 reconfigures antenna 200 electronically to "point" at the signal source.

Antenna control system 206 also communicates with radio 208 (which can also be a cellular telephone, PDA, or other device 208), which accesses either wireless network 100, or provides access to home network 200 or other devices as desired. Radio 208 is typically a Multiple-Input-Multiple-Output (MIMO) radio, which allows for multiple antenna elements 202 as inputs/outputs from radio 208. Radio 208 can be mobile, or fixed in location. A larger or smaller number of elements 202 can be used without departing from the scope of the present invention. Further, other antenna systems 200 can be used without departing from the scope of the present invention. Antenna control system 206 can use feedback from radio 208 to determine how to energize antenna elements 202, such that radio 208 can maintain communications with system 100 through antenna 200.

Applications for Antenna System

Figure 4:
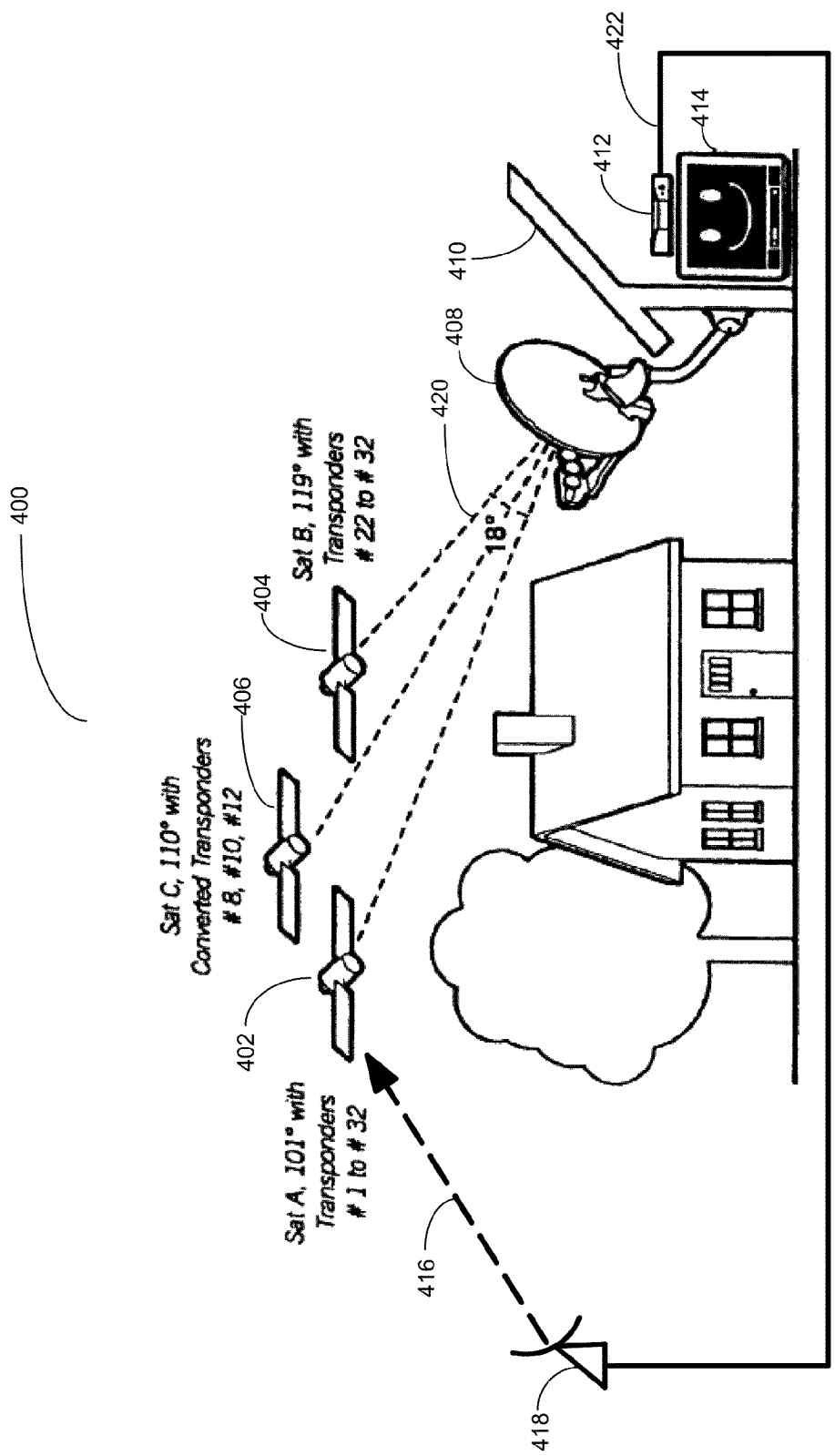
FIG. 4 illustrates a satellite broadcast system of the related art.

FIG. 4 illustrates a satellite broadcast system of the related art.

System 400 uses signals sent from Satellite A (SatA) 402, Satellite B (SatB) 404, and Satellite C (SatC) 406 that are directly broadcast to an Outdoor Unit (ODU) 408 that is typically attached to the outside of a house 410. ODU 408 receives these signals and sends the received signals to IRD 412, which decodes the signals and separates the signals into viewer channels, which are then passed to monitor 414 for viewing by a user. There can be more than one satellite transmitting from each orbital location and additional orbital locations without departing from the scope of the present invention.

Satellite uplink signals 416 are transmitted by one or more uplink facilities 418 to the satellites 402-406 that are typically in geosynchronous orbit. Satellites 402-406 amplify and rebroadcast the uplink signals 416, through transponders located on the satellite, as downlink signals 420. Depending on the satellite 402-406 antenna pattern, the downlink signals 420 are directed towards geographic areas for reception by the ODU 408.

Alternatively, uplink facilities 418 can send signals via cable 422 either in conjunction with uplink signals 416 or instead of uplink signals 416 to IRD 412, for display on monitor 414.

Each satellite 402-406 broadcasts downlink signals 420 in typically thirty-two (32) different frequencies, which are licensed to various users for broadcasting of programming, which can be audio, video, or data signals, or any combination. These signals are typically located in the Ku-band of frequencies, i.e., 11-18 GHz, or in the Ka-band of frequencies, i.e., 18-40 GHz.

As satellites 402-406 broadcast additional services and additional channels to the home, users will like and expect these additional services to be delivered at reasonable cost. Viewers and users of services, e.g., wireless networking, Internet services, etc., will like and expect to have access to these services and integrate these services with other services, e.g., wireless telephone communications, etc.

Figure 5:
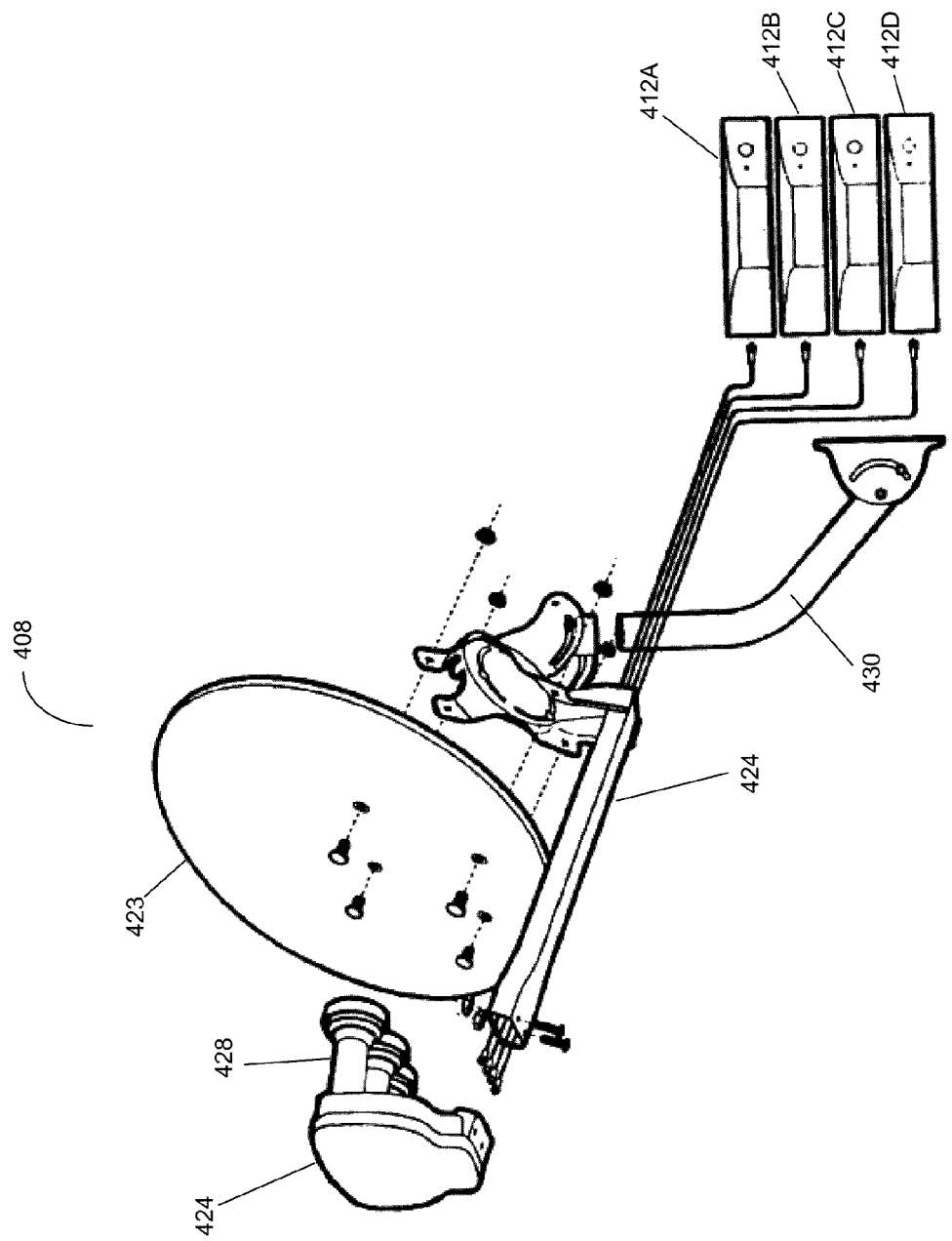
FIG. 5 illustrates a typical ODU of the related art.

FIG. 5 illustrates a typical ODU of the related art.

ODU 408 typically uses reflector dish 423 and feedhorn assembly 424 to receive and direct downlink signals 420 onto feedhorn assembly 424. Reflector dish 422 and feedhorn assembly 424 are typically mounted on bracket 426 and attached to a structure for stable mounting. Feedhorn assembly 424 typically comprises one or more Low Noise Block converters 428, which are connected via wires or coaxial cables to a multiswitch, which can be located within feedhorn assembly 424, elsewhere on the ODU 408, or within house 410. LNBs typically downconvert the FSS-band, Ku-band, and Ka-band downlink signals 420 into frequencies that are easily transmitted by wire or cable, which are typically in the L-band of frequencies, which typically ranges from 950 MHz to 2150 MHz. This downconversion makes it possible to distribute the signals within a home using standard coaxial cables. ODU 408 is typically mounted to home 410 via a mast 430 or other assembly which enables alignment of dish 423 with the various satellites 402-406.

The multiswitch enables system 400 to selectively switch the signals from SatA 402, SatB 404, and SatC 406, and deliver these signals via cables 424 to each of the IRDs 412A-D located within house 410. Typically, the multiswitch is a five-input, four-output (5×4) multiswitch, where two inputs to the multiswitch are from SatA 402, one input to the multiswitch is from SatB 404, and one input to the multiswitch is a combined input from SatB 404 and SatC 406. There can be other inputs for other purposes, e.g., off-air or other antenna inputs, without departing from the scope of the present invention. The multiswitch can be other sizes, such as a 6×8 multiswitch, if desired. SatB 404 typically delivers local programming to specified geographic areas, but can also deliver other programming as desired.

To maximize the available bandwidth in the Ku-band of downlink signals 420, each broadcast frequency is further divided into polarizations. Each LNB 428 can only receive one polarization at time, so by aligning polarizations between the downlink polarization and the LNB 428 polarization, downlink signals 420 can be selectively filtered out from travelling through the system 400 to each IRD 412A-D.

IRDs 412A-D currently use a one-way communications system to control the multiswitch. Each IRD 412A-D has a dedicated cable 424 connected directly to the multiswitch, and each IRD independently places a voltage and signal combination on the dedicated cable to program the multiswitch. For example, IRD 412A may wish to view a signal that is provided by SatA 402. To receive that signal, IRD 412A sends a voltage/tone signal on the dedicated cable back to the multiswitch, and the multiswitch delivers the SatA 402 signal to IRD 412A on dedicated cable 424. IRD 412B independently controls the output port that IRD 412B is coupled to, and thus may deliver a different voltage/tone signal to the multiswitch. The voltage/tone signal typically comprises a 13 Volts DC (VDC) or 18 VDC signal, with or without a 22 kHz tone superimposed on the DC signal. 13 VDC without the 22 kHz tone would select one port, 13 VDC with the 22 kHz tone would select another port of the multiswitch, etc. There can also be a modulated tone, typically a 22 kHz tone, where the modulation schema can select one of any number of inputs based on the modulation scheme.

To reduce the cost of the ODU 408, outputs of the LNBs 128 present in the ODU 408 can be combined, or "stacked," depending on the ODU 408 design. The stacking of the LNB 428 outputs occurs after the LNB has received and downconverted the input signal. This allows for multiple polarizations, one from each satellite 402-406, to pass through each LNB 428. So one LNB 428 can, for example, receive the Left Hand Circular Polarization (LHCP) signals from SatC 402 and SatB 404, while another LNB receives the Right Hand Circular Polarization (RHCP) signals from SatB 404, which allows for fewer wires or cables between the LNBs 428 and the multiswitch.

The Ka-band of downlink signals 420 will be further divided into two bands, an upper band of frequencies called the "A" band and a lower band of frequencies called the "B" band. Once satellites are deployed within system 400 to broadcast these frequencies, each LNB 428 can deliver the signals from the Ku-band, the A band Ka-band, and the B band Ka-band signals for a given polarization to the multiswitch. However, current IRD 412 and system 400 designs cannot tune across this entire frequency band, which limits the usefulness of this stacking feature.

By stacking the LNB 428 inputs as described above, each LNB 428 typically delivers 48 transponders of information to the multiswitch, but some LNBs 428 can deliver more or less in blocks of various size. The multiswitch allows each output of the multiswitch to receive every LNB 428 signal (which is an input to the multiswitch) without filtering or modifying that information, which allows for each IRD 412 to receive more data. However, as mentioned above, current IRDs 412 cannot use the information in some of the proposed frequencies used for downlink signals 420, thus limiting the information transmitted in those downlink signals 420.

In addition, all inputs to the multiswitch are utilized by the current satellite 402-406 configuration, which inhibits upgrades to the system 400 for additional satellite downlink signals 520 to be processed by the IRD 412. Further, adding another IRD 412 to a house 410 requires a cabling run back to the ODU 408. Such limitations on the related art make it difficult and expensive to add new features, such as additional channels, high-definition programming, additional satellite delivery systems, etc., or to add new IRD 412 units to a given house 410.

Figure 6:
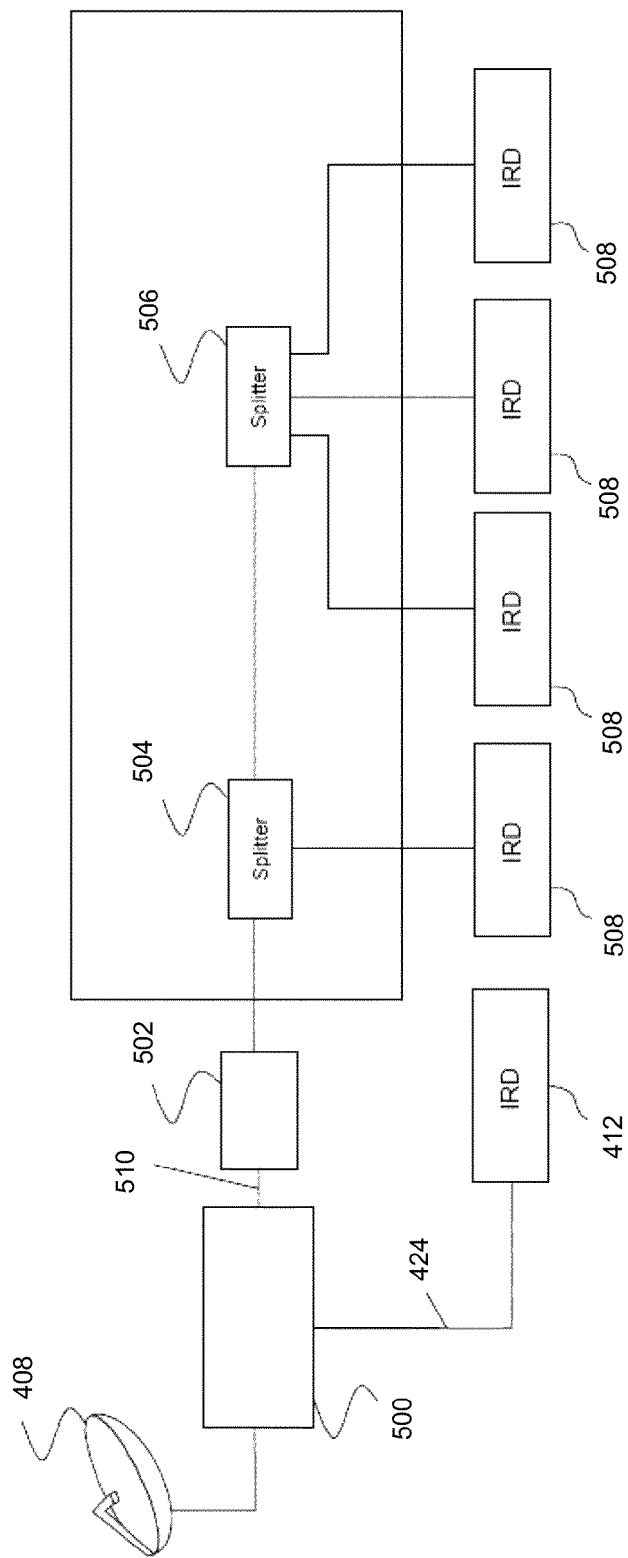
FIG. 6 illustrates a single wire multiswitch embodiment of a satellite broadcast system of the related art.

FIG. 6 illustrates a single wire multiswitch embodiment of a satellite broadcast system of the related art.

In one of more embodiments of the present invention, ODU 408 is coupled to Frequency Translation Module (FTM) 500, also known as a Single Wire Multiswitch (SWiM) 500. SWiM 500 is coupled to power injector 502. SWiM 500 is able to directly support currently installed IRD 412 directly as shown via cable 424, as described with respect to FIGS. 4 and 5.

The SWiM 500 is also able to support new IRDs 508, via a network of signal splitters 504 and 506, and power injector 502. New IRDs 508 are able to perform two-way communication with SWiM 500, which assists IRDs 508 in the delivery of custom signals on private IRD selected channels via a single cable 510. Each of the splitters 504 and 506 can, in some installations, have intelligence in allowing messages to be sent from each IRD 508 to SWiM 500, and back from SWiM 500 to IRDs 508, where the intelligent or smart signal splitters 504 and 506 control access to the SWiM 500.

The two-way communication between IRDs 508 and SWiM 500 can take place via cable 510, or via other wiring, such as power distribution lines or phone lines that are present within house 410.

Figure 7:
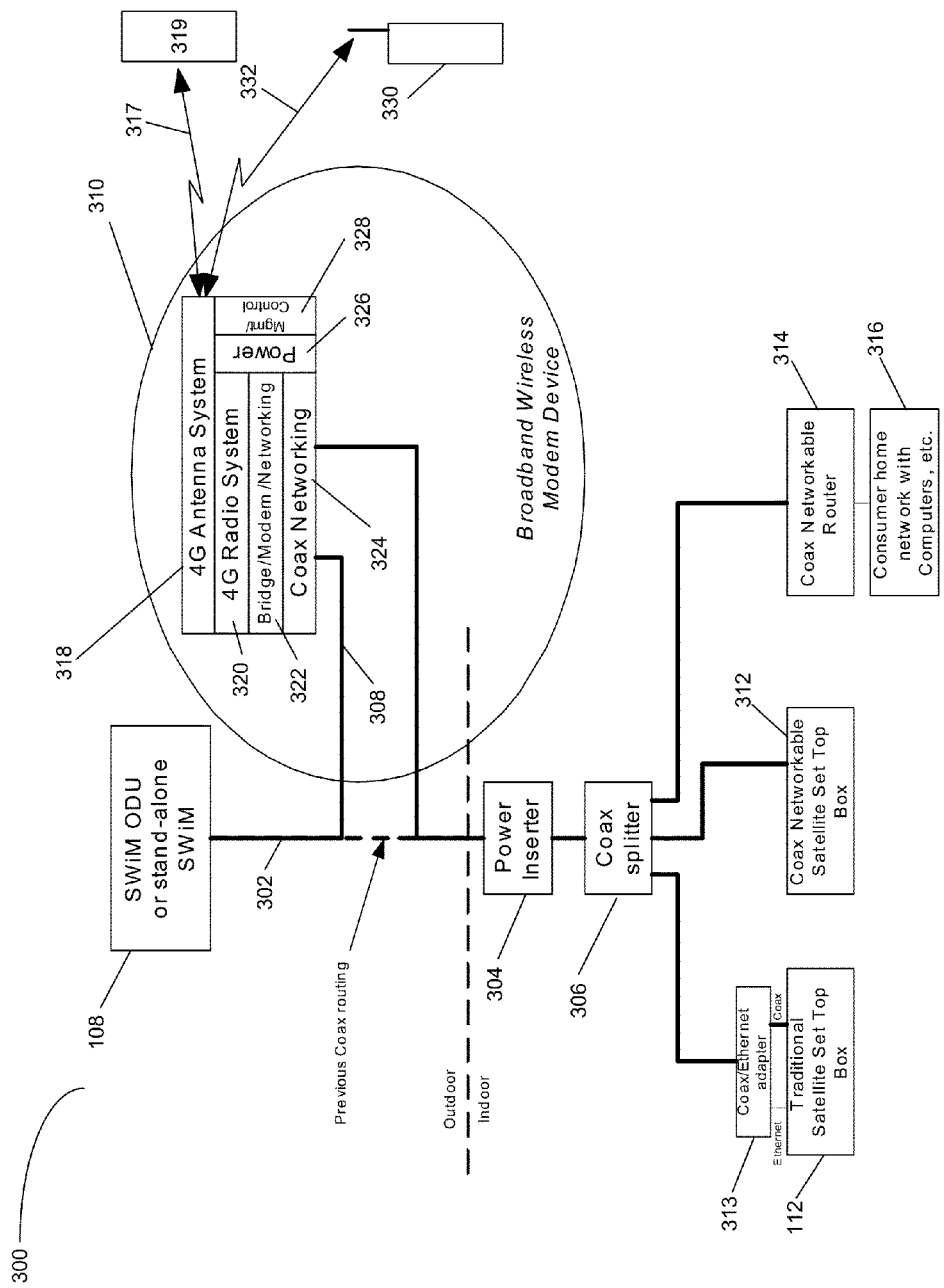
FIG. 7 illustrates an application of one or more embodiments of the present invention.

FIG. 7 illustrates an application of one or more embodiments of the present invention.

System 300 illustrates the ODU 408, which can be an ODU 408 as shown in FIG. 2 either combined with a SWiM 500 module allowing for a single-cable approach to satellite signal distribution as shown in FIG. 5, or as a multiple cable 424 approach as shown in FIG. 2. In a SWiM 500 system, cable 302 (instead of multiple cables 424) is routed to a power inserter 304, and then to a coaxial signal splitter 306 for signal delivery of the signal on cable 302 to one or more IRDs 412 as desired directly from splitter 306.

With the present invention, cable 302 is now routed via path 308 to a broadband capable device 310 that is mounted outside the home 410. Typically, broadband device 310 can be mounted along with ODU 408, e.g., on the mast 430, or elsewhere on ODU 408, or separate from ODU 408 as desired or depending on the packaging of broadband device 310. Further, broadband device 310 can stand alone if desired.

Broadband device 310 enables additional devices 312 and 314 to operate in conjunction with the satellite system 400. For example, an IRD 312 that is networkable via coaxial cable is now enabled using the broadband device 310, and a network router 314 can now be coupled to the satellite delivery system 400 for delivery of satellite and internet signals to a computer 316 or other devices as desired.

External Broadband Device

Within broadband device 310, several components enable the services and delivery of signals. Initially, antenna system 200 (shown here as antenna 318) is used to enable two-way communication 317 between at least one wireless network 319, e.g., the Verizon LTE network, the Sprint network, the AT&T network, etc. Antenna system 200 can be of any design, e.g., omnidirectional, phased array, etc., that will enable communications with such networks, and can transmit and receive any frequency band as desired.

A radio system 320, typically including radio 208, that is compatible with the antenna system 200, enables the coding and frequency generation compatible with the wireless network(s) 319, and is also typically present in broadband device 310. Such a radio system 320 can be designed to be compatible with a single wireless network 319, or with multiple wireless networks 319, as desired.

To couple the wireless network(s) 319 to the satellite signals, a bridge/modem/networking system 322 is used to couple the wireless network 319 with the satellite system 400. Such a system 322 typically comprises a bridge or combiner to couple the two signals (wireless and satellite) together at specific frequencies, coding schemes, etc., and to translate these signals into signals that can be used by the various devices 412, 312, and 314 (and other devices as desired).

Various architectures are possible within the system 322 are possible, e.g., routers, firewalls, Dynamic Host Configuration Protocol (DHCP), Network Address Translation (NAT) functions, etc., which are all possible within the scope of the present invention. Although discussed herein as a generic system 322, system 322 encompasses capabilities to combine any wireless network 319 implementation with a local antenna/delivery system 200.

Further, system 322 allows for networking of these signals, as well as a modem to modulate and demodulate the signals into desired or predetermined modulation schema for use by the various devices 412, 312, and 314 (and other devices as desired). To enable IRD 412 to communicate through the new network, an adapter 313 can be inserted between IRD 412 and splitter 306.

A further element of the wireless device 310 networks the satellite and wireless signals onto a coaxial network, shown as coax networking system 324. Finally, a power source 326 and management/control system 328 are shown. System 328 is a controller for the wireless portion of the system 300, and typically includes control system 206. However, commands from the satellite system 400, either via ODU 408 or devices 412 and 312, or devices 316, can be sent and interpreted by the control system 328 as desired. Control of the broadband device 310 can also be dedicated to the wireless system 319 if desired. Power source 326 can be a standalone source, or can derive power from the power inserter or from the IRD 412 as in a typical system 400.

The antenna system 200 also enables the use of broadband device 310 as a relay port to communicate with handheld devices 330 via a local wireless communications path 332. Thus, if handheld device 330 cannot receive enough signal strength from wireless network 319, broadband device 310 can act as a relay to connect handheld device to wireless network 319 via path 332. Such a path 332 can be controlled by wireless network 319 or via control of the broadband device 310 through user control, or via satellite system 400, as desired.

As such, antenna system 200 enables a structure, e.g., home 400, to be served with a broadband interne connection via network 319 and connection 317, whereas, without the additional gain of antenna system 200, either the connection 317 would not be present at all, or the connection 317 could not support the data speeds that connection 317 can support with antenna system 200. Further, it is envisioned that the wireless network 319 will be at least "4G" capable in order to provide additional capability on the broadband service that will be competitive with DSL and Cable Modem based systems. Both the 3GPP Long Term Evolution (LTE) and 802.16 based WiMax technologies meet this 4G requirement.

This antenna system 200 is useable with a 4G wireless radio system 219, and comprises a plurality of antenna elements 200 arranged in a fashion to sectorize the incoming signals by polarization and azimuth, an antenna control system 206 used to sense and select the optimal antenna inputs, a switching system 204 to take the desired inputs and route them to the desired outputs, and a plurality of outputs for use by a Multi-Input-Multi-Output (MIMO) radio 208.

Although the preferred embodiment of the solution is in a single integrated housing, it is possible to design the solution to allow for a remotely detachable antenna for location at a more optimal location. As such, the antenna system 200 can be co-located with ODU 408, or can be a standalone system, or can otherwise be connected with ODU 408 such that ODU 408 and antenna system 200 can both be optimized for their respective signal reception and/or transmission.

Embodiments of the present invention enable superior efficiency on the wireless network by improving the link budget by increasing the user device antenna gain by approximately 10 dB due to increased gain in the direction of the wireless system cell tower, elevating the device by several meters resulting in lower propagation losses by 5-10 dB, and decreasing interference from adjacent cell sites resulting in a lower interference environment.

Further, the improved link budget allows for operation with a higher order modulation format (e.g. 64 QAM instead of QPSK), thereby allowing for higher connection speeds and/or less time resource required on the wireless network to achieve the desired user connection speed. This leads to higher efficiency of the wireless network, making it feasible to offer residential fixed broadband service over a wireless network.

As such, when mounted to a home 410 of a particular user, antenna system 200 can extend the useful coverage area of wireless system 319 for that user, or, as desired, for additional users that can be authorized to use antenna system 200. Antenna system 200 can also provide a larger throughput for a given user in system 319, since the communications link 317 is now stronger and can handle additional data as opposed to a separate link with lower signal strength, etc. for a given user. Further, antenna system 200 can be used as a relay node for other users, such that antenna system 200 on a first user's home can act as a relay for another user that is further out of system 319 coverage area, thus extending system 319 coverage area without the need for additional BTS 106 installations. Such access to antenna system 200 can be provided by system 319 provider, the user, the satellite broadcast system provider, or other entities as desired. Further, such access can be controlled or superceded at any time.

Figure 8:
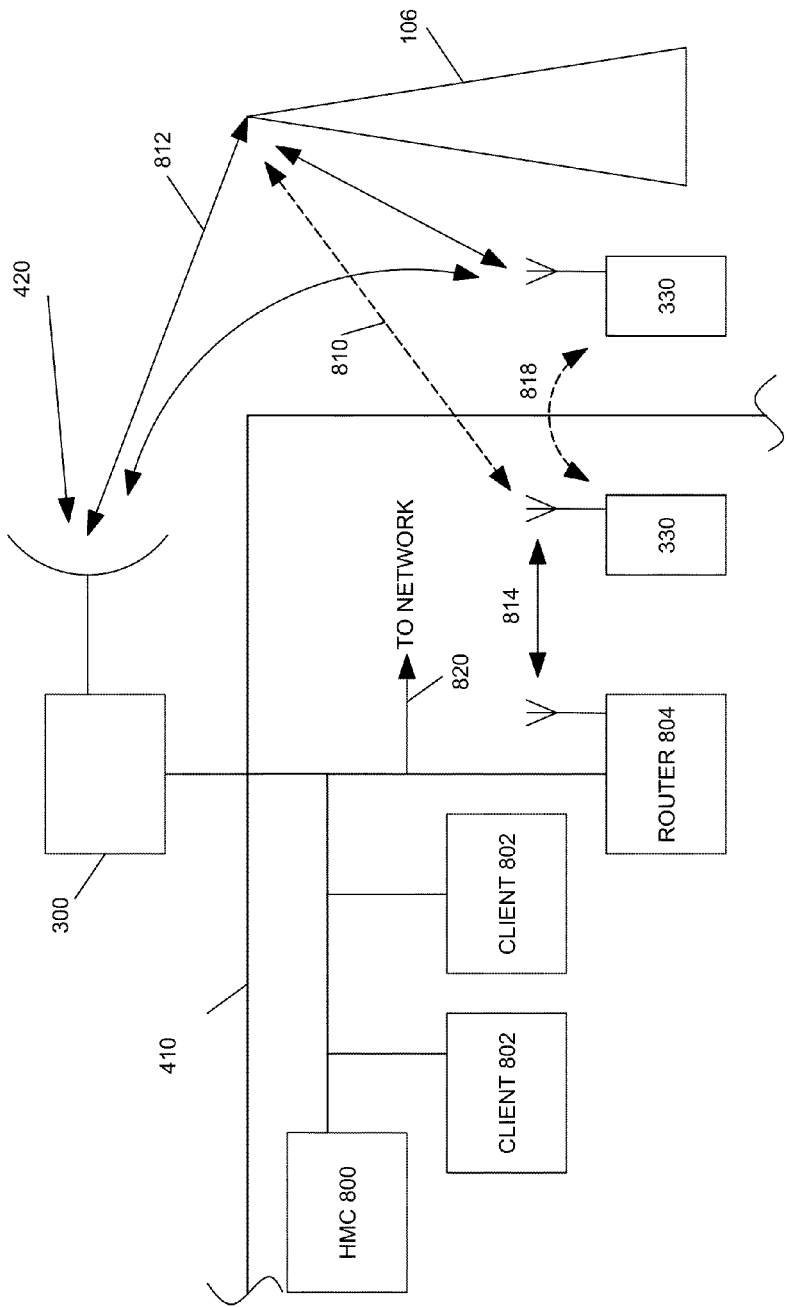
FIG. 8 illustrates an application of one or more embodiments of the present invention.

FIG. 8 illustrates an application of one or more embodiments of the present invention.

House 410 is shown, with Home Media Center 800 (a specific type of IRD 508), a plurality of clients 802 (another type of IRD 508), and a router 804 coupled to antenna 806. Antenna 806 is a combined antenna comprising ODU 408 and antenna 200, and can comprise additional antennas as desired without departing from the scope of the present invention.

Typically, mobile device 330 and/or mobile phone 112 communicate with BTS 106 directly, as shown by signal path 808. However, when mobile device 330 is inside of house 410, communication path 810, again a direct path from device 330 to BTS 106, is attenuated and or interfered with because of house 410, i.e., house 410 blocks some of the signal transmissions between device 330 and BTS 106, multipath interference occurs because of the interposition of house 410 and/or other buildings, etc. As such, as much as 10-20 dB of signal path loss is experienced by device 330 when using communications path 810 as opposed to path 808. Such losses can severely limit the data throughput between device 330 and BTS 106, or, in some cases, prevent communication between device 330 and BTS 106 because the signal strength is not high enough for device 330 to maintain communications path 810.

One or more embodiments of the present invention, however, allow for a different communications path 812, which then forwards the communications signals from BTS 106 through router 804 or other transmission device within home 410, to communicate with device 330 via communications path 814. Such new paths 812 and 814 provide additional signal strength and, depending on the design, gain, and other characteristics of antenna 806 and/or router 804, may provide an increase in data throughput between device 330 and BTS 106. Further, antenna 806 (either in the form of ODU 408 and/or antenna 200) can act as a repeater for communications path 808 in that antenna 806 can accept a signal from BTS 106 and repeat the exact same signal out such that device 330 can receive the signal via path 816; or antenna 806 can act as a relay for signal 812 in that antenna 806, via system 300, can reformat signal 812 with a frequency translation, new coding schema, new transmission rate, etc., such that device 330 can receive signal 812 in a new format. For example, and not by way of limitation, an embodiment of the present invention, via antenna 806 and other electronics coupled to system 300, can translate a 746-756 MHz Fourth Generation (4G) signal (from Verizon's 4G network) to a wi-fi network such that a Verizon phone having 4G and wi-fi capabilities can communicate through both networks, and switch from the 4G network to the wi-fi network or vice versa. Other translations of frequency, transmission schema, or other signal characteristics are also possible within the scope of the present invention.

As device 330 moves from inside of house 410 to outside of house 410, or vice versa, as shown by movement arrow 818, a handoff can occur between the communications paths that couple device 330 to BTS 106. So, for example, if device 330 is outside house 410 and moves inside, system 300 sees that the power from device 330 is stronger through router 804 (or other transmission device within house 410) than device 330 receives directly from BTS 106, then system 300 switches communications paths from path 808 to paths 812/814 to maintain communications with device 330. Further, system 300 couples the internet (or other network), typically via a broadband connection as shown by connection 820, to HMC 800, clients 802, and device 330. Such a connection can also include a "wi-fi" connection (typically through router 804 or other wireless transmitters in house 410).

While HMC 800 and clients 802 typically receive satellite signals 420 via antenna 806, system 300 can also deliver satellite signals 420 to mobile device 330 if desired.

CONCLUSION

The present invention comprises systems and methods for increasing throughput and range in a wireless communication system. An antenna for use in a wireless communications system in accordance with one or more embodiments of the present invention comprises a plurality of antenna elements, an antenna selection switch, coupled to the plurality of antenna elements, and a control system, coupled to the antenna selection switch, wherein the control system selectively energizes the plurality of antenna elements to create a communications link to a device in the wireless communications system through the antenna.

Such an antenna further optionally comprises the control system selectively energizing the plurality of antenna elements to increase a data rate to the device in the wireless communications system, the control system using feedback from the device to selectively energize the plurality of antenna elements, the wireless communications system using communications signals having a plurality of polarizations, the plurality of antenna elements being selected based on a polarization of the communications signals used in the communications link to the device, the antenna being mounted proximate with a satellite receive antenna, the antenna providing a higher signal throughput as compared to a wireless communications system lacking the antenna, the higher signal throughput being provided by an increase in wireless communications system signal strength, the higher signal throughput being provided by additional gain in the antenna, the device being coupled to a satellite broadcast system through the antenna, and a coaxial networking bridge, for coupling a satellite signal on the satellite broadcast system with a wireless signal in the wireless communications system, wherein the coaxial network bridge enables the device to receive the satellite signal and the wireless signal.

A system for combining a satellite broadcast system with a wireless network in accordance with one or more embodiments of the present invention comprises a wireless network antenna, comprising a plurality of antenna elements, an antenna selection switch, coupled to the plurality of antenna elements, and a control system, coupled to the antenna selection switch, wherein the control system selectively energizes the plurality of antenna elements to create a communications link to a device in the wireless communications system through the antenna, a satellite receive antenna, and a coaxial networking bridge, coupled to the satellite receive antenna and the wireless network antenna, for coupling a satellite signal on the satellite broadcast system with a wireless signal on the wireless network, wherein the coaxial network bridge enables a device to receive the satellite signal and the wireless signal.

Such a system further optionally comprises the wireless system device being mounted with the satellite receive antenna, the wireless system device being a relay device for at least one wireless device, the at least one wireless device receiving the satellite signal, a device using the wireless network selectively communicates with the wireless network through the wireless network antenna based on signal characteristics of the device, communication with the device switching between the wireless network antenna and another antenna in the wireless network during communication with the device, and the wireless antenna serving as a relay for a wireless device.

The foregoing description of embodiments of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description.

What is claimed is:

1. An antenna for use in a wireless communications system, comprising:
a plurality of antenna elements;
an antenna selection switch, coupled to the plurality of antenna elements;
a control system, coupled to the antenna selection switch, wherein the control system selectively energizes the plurality of antenna elements to create a communications link to a device in the wireless communications system through the antenna;
a coaxial networking bridge, for providing a satellite signal of a satellite broadcasting system as a wireless signal in the wireless communication system, characterized in that the coaxial network bridge enables the satellite broadcast system to send commands to the device.

2. The antenna of claim 1, wherein the control system selectively energizes the plurality of antenna elements to increase a data rate to the device in the wireless communications system.

3. The antenna of claim 2, wherein the control system uses feedback from the device to selectively energize the plurality of antenna elements.

4. The antenna of claim 3, wherein the wireless communications system uses communication signals having a plurality of polarizations.

5. The antenna of claim 4, wherein the plurality of antenna elements are selected based on a polarization of the communications signals used in the communications link to the device.

6. The antenna of claim 4, wherein the antenna is mounted proximate with a satellite receive antenna.

7. The antenna of claim 1, wherein the antenna provides a higher signal throughput as compared to a wireless communications system lacking the antenna.

8. The antenna of claim 7, wherein the higher signal throughput is provided by an increase in wireless communications system signal strength.

9. The antenna of claim 7, wherein the higher signal throughput is provided by additional gain in the antenna.

10. The antenna of claim 1, wherein the coaxial network bridge enables the device to receive the satellite signal and the wireless signal.

11. A system for combining a satellite broadcast system with a wireless network, comprising:
- a) a wireless network antenna, comprising:
  - a plurality of antenna elements;
  - an antenna selection switch, coupled to the plurality of antenna elements; and
  - a control system, coupled to the antenna selection switch, wherein the control system selectively energizes the plurality of antenna elements to create a communications link to a device in the wireless network through the antenna;
- b) a satellite receive antenna; and
- c) a coaxial networking bridge, coupled to the satellite receive antenna and the wireless network antenna, for providing a satellite signal on the broadcast system with a wireless signal on the wireless network, characterized in that the coaxial network bridge enables the satellite broadcast system to send commands to the device.

12. The system of claim 11, wherein the wireless network antenna is mounted with the satellite receive antenna.

13. The system of claim 11, wherein the wireless network antenna is a relay device for the device.

14. The system of claim 13, wherein the device receives the satellite signal via the wireless network antenna.

15. The system of claim 11, wherein the device selectively communicates with the wireless network through the wireless network antenna based on signal characteristics of the device.

16. The system of claim 15, wherein communication with the device switches between the wireless network antenna and another antenna in the wireless network during communication with the device.

17. The system of claim 11, wherein the coaxial network bridge enables the device to receive the satellite signal and the wireless signal.

18. The system of claim 11, wherein the plurality of antenna elements comprises elements for vertical and horizontal polarization arranged for sectorization of incoming signals by polarization and azimuth.

* * * * *